United States Patent [19]
Gemeniano

[11] Patent Number: 6,123,046
[45] Date of Patent: Sep. 26, 2000

[54] DEVICE FOR DISPOSING OF THE FECES FROM AN ANIMAL UTILIZING ANY DISPOSABLE PLASTIC BAG

[76] Inventor: Virgilo C. Gemeniano, P.O. Box 800188, Elmhurst, N.Y. 11380

[21] Appl. No.: 09/176,282

[22] Filed: Oct. 21, 1998

[51] Int. Cl.⁷ .............................. A01K 29/00; E01H 1/12
[52] U.S. Cl. .......................... 119/161; 119/867; 294/1.4; 294/1.5
[58] Field of Search .................... 119/161, 867; D30/161, 162; 294/1.3, 1.4, 1.5

[56] References Cited

U.S. PATENT DOCUMENTS

| | | | |
|---|---|---|---|
| D. 279,512 | 7/1985 | Schaffer | D30/162 |
| D. 285,012 | 8/1986 | Willis | D30/162 |
| 3,677,596 | 7/1972 | Yonaites et al. | 294/1.4 |
| 3,744,453 | 7/1973 | Deitch . | |
| 3,786,780 | 1/1974 | Pezzino | 294/1.5 |
| 3,819,220 | 6/1974 | Bredt | 294/1.5 |
| 3,986,744 | 10/1976 | Krogstad et al. | 294/1.3 |
| 4,012,067 | 3/1977 | Travis | 294/1.4 |
| 4,156,400 | 5/1979 | Migdal . | |
| 4,185,861 | 1/1980 | Berner | 294/1.5 |
| 4,466,647 | 8/1984 | Spevak | 294/1.5 |
| 4,477,111 | 10/1984 | Crooks | 294/1.4 |
| 4,500,125 | 2/1985 | Olson | 294/1.4 |
| 4,852,924 | 8/1989 | Ines | 294/1.5 |
| 5,634,678 | 6/1997 | Bailey | 294/1.5 |
| 5,895,082 | 4/1999 | Kaluzny | 294/1.4 |

*Primary Examiner*—Peter M. Poon
*Assistant Examiner*—Yvonne R. Abbott
*Attorney, Agent, or Firm*—Richard L. Miller

[57] ABSTRACT

A device for disposing of feces from an animal by utilizing a disposable plastic bag. The device includes a handle held in the hand and an arm arrangement that removably engages the disposable plastic bag. The disposable plastic bag is attached to the arm arrangement by first flipping a mouth of the disposable plastic bag down to form a lip, then holding the arm arrangement in one hand, near a prong of a pair of prongs of the arm arrangement, then grasping the lip with the other hand, then hooking the disposable plastic bag plastic bag onto the prong, then pulling the lip snugly along a closest arm of a pair of arms of the arm arrangement, towards a closest eye hook of a pair of eye hooks of the arm arrangement, then hooking the disposable plastic bag onto the closest eye hook, then continuing to pull the lip snugly towards the other eye hook, then hooking the disposable plastic bag onto the other hook, then continuing to pull the lip snugly along the other arm, towards the other prong, then hooking the disposable plastic bag onto the other prong.

11 Claims, 10 Drawing Sheets

STEP 7

HOOK THE ORDINARY DISPOSABLE PLASTIC BAG (34), AT APPROXIMATELY 1/2" AWAY FROM THE LIP (80) OF THE ORDINARY DISPOSABLE PLASTIC BAG (34), ONTO THE CLOSEST EYE HOOK OF THE PAIR OF EYE HOOKS (74) OF THE ARM ARRANGEMENT (32)

STEP 8

CONTINUE TO PULL THE LIP (80) OF THE ORDINARY DISPOSABLE PLASTIC BAG (34) SNUGLY TOWARDS THE OTHER EYE HOOK OF THE PAIR OF EYE HOOKS (74) OF THE ARM ARRANGEMENT (32)

DEVICE FOR DISPOSING OF THE FECES FROM AN ANIMAL UTILIZING ANY DISPOSABLE PLASTIC BAG

BACKGROUND OF THE INVENTION

1. Field of the Invention

The present invention relates to a device for disposing of feces from an animal. More particularly, the present invention relates to a device for disposing of feces from an animal utilizing any disposable plastic bag.

2. Description of the Prior Art

Numerous innovations for animal feces disposal devices have been provided in the prior art that will be described. Even though these innovations may be suitable for the specific individual purposes to which they address, however, they differ from the present invention.

A FIRST EXAMPLE, U.S. Pat. No. 3,744,453 to Deitch teaches a sanitary waste receiver and guide rod for use with dog, whereby their waste products or droppings may be received and disposed of in a sanitary manner. The device consists of a disposable pouch and a reusable guide rod adapted to be removably attached to the pouch.

A SECOND EXAMPLE, U.S. Pat. No. 3,786,780 to Pezzino teaches a portable canine toilet, in combination a holder and disposable waste receiving means adapted to be removably fitted upon the holder. The holder has a projecting means mounted on its rod portion, and the receiving means has a partially circumferential sleeve along its upper portion and into which the lower part of the holder is inserted. The receiving means also has a stringed collar at the top of the upper portion, the protruding portion of the string normally positioned on the projecting means.

A THIRD EXAMPLE, U.S. Pat. No. 4,156,400 to Migdal teaches an animal feces disposal device. The device includes a thin flexible sheet of water repellent material which has a stiffening member centrally mounted to it. A drawstring running about the periphery of the sheet serves to close the sheet after use. The stiffening member is arranged so that the feces will be centrally positioned within the device to avoid any hand contact by the user. After use the device may be disposed of as a unit.

It is apparent that numerous innovations for animal feces disposal devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a device for disposing of feces from an animal utilizing any disposable plastic bag that avoids the disadvantages of the prior art.

ANOTHER OBJECT of the present invention is to provide a device for disposing of feces from an animal utilizing any disposable plastic bag that is simple and inexpensive to manufacture.

STILL ANOTHER OBJECT of the present invention is to provide a device for disposing of feces from an animal utilizing any disposable plastic bag that is simple to use.

BRIEFLY STATED, YET ANOTHER OBJECT of the present invention is to provide a device for disposing of feces from an animal by utilizing an disposable plastic bag. The device includes a handle held in the hand and an arm arrangement that removably engages the disposable plastic bag. The disposable plastic bag is attached to the arm arrangement by first flipping a mouth of the disposable plastic bag down to form a lip, then holding the arm arrangement in one hand, near a prong of a pair of prongs of the arm arrangement, then grasping the lip with the other hand, then hooking the disposable plastic bag onto the prong, then pulling the lip snugly along a closest arm of a pair of arms of the arm arrangement, towards a closest eye hook of a pair of eye hooks of the arm arrangement, then hooking the disposable plastic bag onto the closest eye hook, then continuing to pull the lip snugly towards the other eye hook, then hooking the disposable plastic bag onto the other hook, then continuing to pull the lip snugly along the other arm, towards the other prong, then hooking the disposable plastic bag onto the other prong.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING 20 device for disposing of feces from an animal utilizing an disposable plastic bag of the present invention
22 hand of user 24
24 user
26 feces from animal 28
28 animal
30 handle for holding in hand 22 of user 24
32 arm arrangement
34 disposable plastic bag
36 shaft of handle 30
38 collar of shaft 36 of handle 30
40 proximal end of shaft 36 of handle 30
42 distal end of shaft 36 of handle 30
44 circumferential flange on distal end 42 of shaft 36 of handle 30
46 externally threaded nipple on distal end 42 of shaft 36 of handle 30
47 non-slip boot of handle 30
48 body of arm arrangement 32
50 transverse portion of body 48 of arm arrangement 32
52 apex of transverse portion 50 of body 48 of arm arrangement 32
54 pair of legs of transverse portion 50 of body 48 of arm arrangement 32
56 pair of base angles of transverse portion 50 of body 48 of arm arrangement 32
58 upper surfaces of pair of base angles 56 of transverse portion 50 of body 48 of arm arrangement 32
59 base of transverse portion 50 of body 48 of arm arrangement 32
60 collar of body 48 of arm arrangement 32
62 internal threads in collar 60 of body 48 of arm arrangement 32
64 pair of arms of body 48 of arm arrangement 32
66 proximal end of each arm of pair of arms 64 of body 48 of arm arrangement 32
68 distal end of each arm of pair of arms 64 of body 48 of arm arrangement 32
70 inner surface of distal end 68 of each arm of pair of arms of body 48 of arm arrangement 32
72 pair of prongs on body 48 of arm arrangement 32
74 pair of hooks on body 48 of arm arrangement 32
72 strap
77 shovel for shoveling feces 26 from animal 28 into disposable plastic bag 34
78 mouth of disposable plastic bag 34
80 lip of disposable plastic bag 34

DETAILED DESCRIPTION OF THE PREFERRED EMBODIMENT

Figure 1:
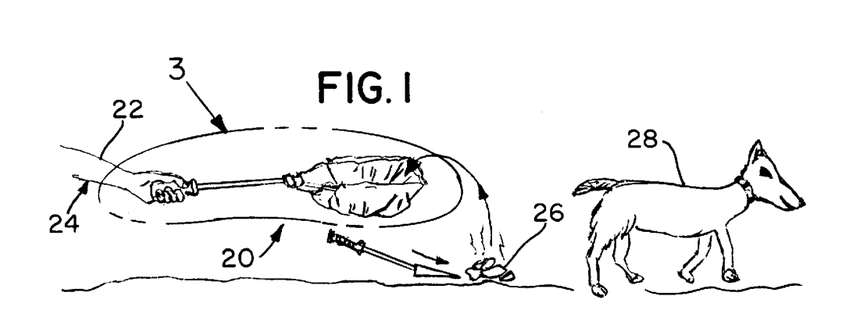
FIG. 1 is a diagrammatic perspective view of a first component of the present invention shoveling feces of an animal off the ground.
Figure 2:
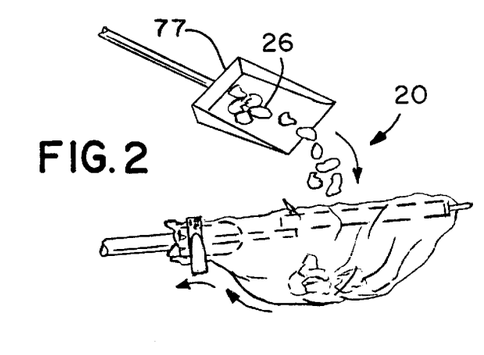
FIG. 2 is a diagrammatic perspective view of the shoveled feces of the animal being dumped into disposable plastic bag being held by an arm arrangement of the present invention.

Referring now to the figures, in which like numerals indicate like parts, and particularly to FIGS. 1 and 2, the device for disposing of feces from an animal utilizing an disposable plastic bag of the present invention is shown generally at 20 for holding in a hand 22 of a user 24 and for disposing of feces 26 from an animal 28.

Figures 3, 5, 6:
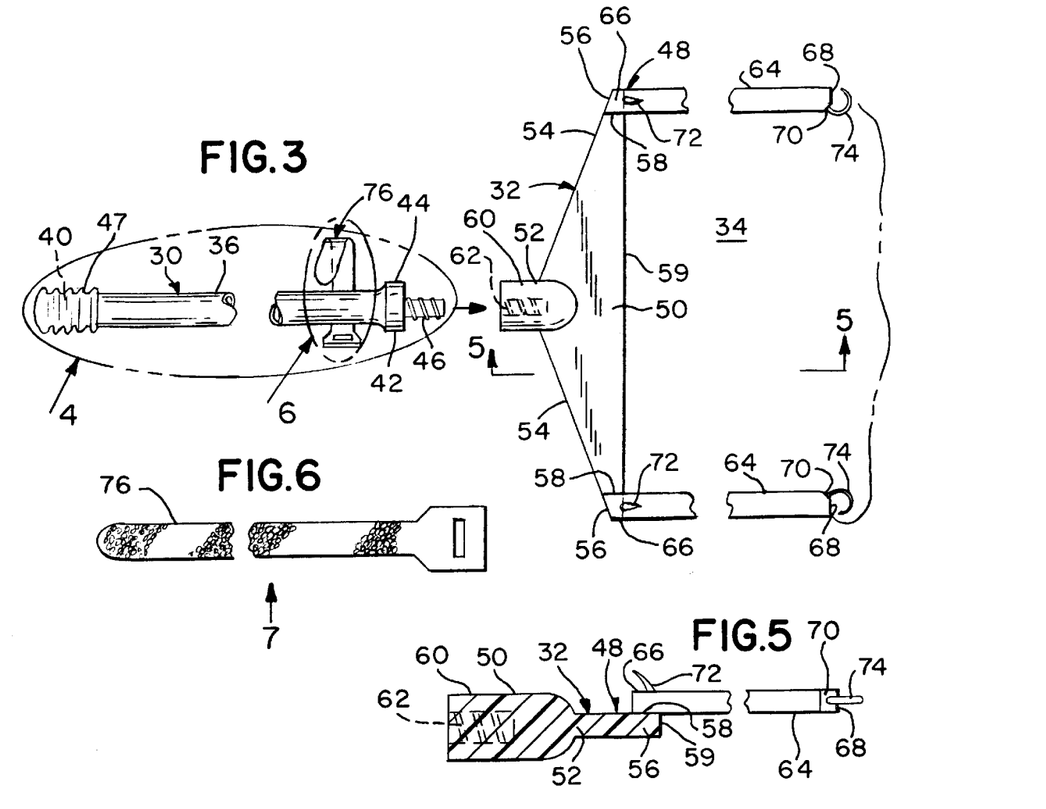
FIG. 3 is an enlarged diagrammatic top plan view of the area generally enclosed in the dotted ellipse identified by arrow in FIG. 1 of the arm arrangement of the present invention.
FIG. 5 is a diagrammatic cross sectional view taken on line 5—5 in FIG. 3.
FIG. 6 is an enlarged diagrammatic plan view of the area generally enclosed in the dotted ellipse identified by arrow 6 in FIG. 3 of the hook and loop fastener strap of the present invention.

The overall configuration of the device for disposing of feces from an animal utilizing an disposable plastic bag 20 can best be seen in FIG. 3, and as such, will be discussed with reference thereto.

The device for disposing of feces from an animal utilizing an disposable plastic bag 20 comprises a handle 30 for holding in the hand 22 of the user 24 and an arm arrangement 32 that extends from the handle 30 for removably engaging an disposable plastic bag 34.

Figure 4:
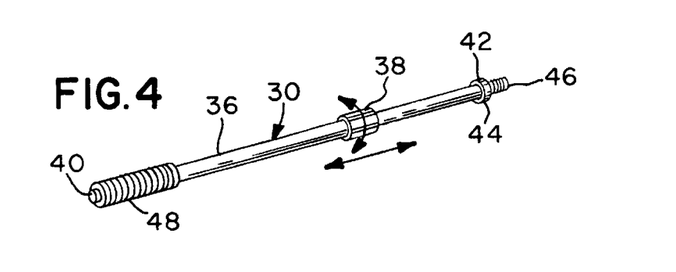
FIG. 4 is a diagrammatic perspective view of the area generally enclosed by the dotted ellipse identified by arrow 4 in FIG. 3 of the handle of the present invention.

The specific configuration of the handle 30 can best be seen in FIGS. 3 and 4, and as such, will be discussed with reference thereto.

The handle 30 comprises a shaft 36 that is slender and elongated, and telescopically adjustable by a collar 38, and has a proximal end 40 and a distal end 42.

The distal end 42 of the shaft 36 of the handle 30 widens into a circumferential flange 44 therearound, with an externally nipple 46 being narrower than and extending axially therefrom.

The handle 30 further comprises a non-slip boot 47 that extends over the proximal end 40 of the shaft 36 of the handle 30 for facilitating grip of the hand 22 of the user 24.

The specific configuration of the arm arrangement 32 can best be seen in FIGS. 3 and 5, and as such, will be discussed with reference thereto.

The arm arrangement 32 comprises a body. 48 that is substantially U-shaped, and extends axially from, opens away from, and is replaceably attached to, the distal end 42 of the shaft 36 of the handle 30.

The body 48 of the arm arrangement 32 has a transverse portion 50 that is isosceles-triangular-shaped in plan view, and has an apex 52, a pair of legs 54 that widen away from the apex 52 of the transverse portion 50 of the body 48 of the arm arrangement 32 and terminate in a pair of base angles 56 with upper surfaces 58, and a base 59.

The body 48 of the arm arrangement 32 further has a collar 60 that extends axially away from the apex 52 of the transverse portion 50 of the body 48 of the arm arrangement 32, and has internal threads 62 that extend axially therein and which replaceably and threadably engage the externally threaded nipple 46 of the distal end 42 of the shaft 36 of the handle 30, with the transverse portion 50 of the body 48 of the arm arrangement 32 being perpendicular to the handle 30.

The body 48 of the arm arrangement 32 further has a pair of arms 64 that are parallel, coplaner, slender, elongated, and rectangular-parallelepiped-shaped.

Each arm of the pair of arms 64 of the body 48 of the arm arrangement 32 extends, at a proximal end 66 thereof, axially away from an upper surface of the pair of upper surfaces 58 of a respective base angle of the pair of base angles 56 of the transverse portion 50 of the body 48 of the arm arrangement 32, to a distal end 68 thereof.

The proximal end 66 of each arm of the pair of arms 64 of the body 48 of the arm arrangement 32 is beveled to match that of the respective base angle of the pair of base angles 56 of the transverse portion 50 of the body 48 of the arm arrangement 32.

The distal end 68 of each arm of the pair of arms 64 of the body 48 of the arm arrangement 32 has an inner surface 70 that is beveled and faces each other.

The body 48 of the arm arrangement 32 further has a pair of prongs 72. Each prong of the pair of prongs 72 of the body 48 of the arm arrangement 32 extends arcuately upwardly and rearwardly from the proximal end 66 of a respective arm of the pair of arms 64 of the body 48 of the arm arrangement 32.

The body 48 of the arm arrangement 32 further has a pair of eye hooks 74. Each eye hook of the pair of eye hooks 74 of the body 48 of the arm arrangement 32 extends arcuately outwardly from the inner surface 70 of distal end 68 of a respective arm of the pair of arms 64 of the body 48 of the arm arrangement 32. device for disposing of feces from an animal utilizing a disposable plastic bag 20 further comprises a strap 76 that is replaceably wound around the shaft 36 of the handle 30.

Figure 7:
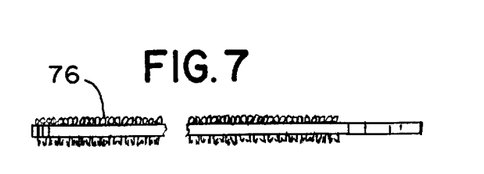
FIG. 7 is a diagrammatic side elevational view taken generally in the direction of arrow 7 in FIG. 6.

The specific configuration of the strap 76 can best be seen in FIGS. 6 and 7, and as such, will be discussed with reference thereto.

The strap 76, is sold under the tradename "GET.A.Grip" which is a registered trademark of The Velcro Companies, and taught in U.S. Pat. No. 5,518,795 which is incorporated herein by reference thereto.

The device for disposing of feces from an animal utilizing a disposable plastic bag 20 further comprises a shovel 77 for shoveling the feces 26 from the animal 28 into the disposable plastic bag 34 (see FIGS. 1 and 2).

The method for attaching the disposable plastic bag 34 to the arm arrangement 32 can best be seen in FIGS. 8–13 and 14A–14G, and as such, will be discussed with reference thereto.

STEP 1: Secure the disposable plastic bag 34 that has a mouth 78 with a circumference of approximately 28" and a length of approximately 12".

Figure 8:
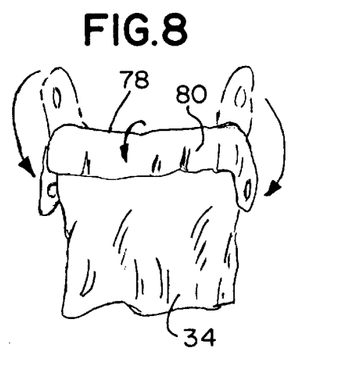
FIG. 8 is a diagrammatic perspective view of the first step in attaching the disposable plastic bag to the arm arrangement.

STEP 2: As shown in FIG. 8, flip the mouth 78 of the disposable plastic bag 34 down in a range of approximately 3" to approximately 4" to form a lip 80.

STEP 3: Hold the arm arrangement 32 between the thumb and forefinger of one hand of the user 24, near a prong of the pair of prongs 72 of the arm arrangement 32.

STEP 4: Grasp the lip 80 of the disposable plastic bag 34 with the other hand of the user 24, with the mouth 78 of the disposable plastic bag 34 facing towards the user 24.

Figure 9:
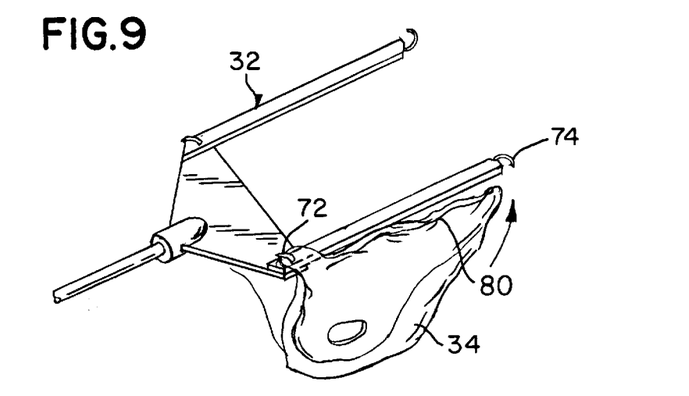
FIG. 9 is a diagrammatic perspective view of the second step in attaching the disposable plastic bag to the arm arrangement.

STEP 5: As shown in FIG. 9, hook the disposable plastic bag 34, at approximately ½" away from the lip 80 of the disposable plastic bag 34, onto the prong of the pair of prongs 72 of the arm arrangement 32.

STEP 6: As shown in FIG. 9, pull the lip 80 of the disposable plastic bag 34 snugly along a closest arm of the pair of arms 64 of the arm arrangement, towards a closest eye hook of the pair of eye hooks 74 of the arm arrangement 32.

Figures 10, 11, 12, 13:
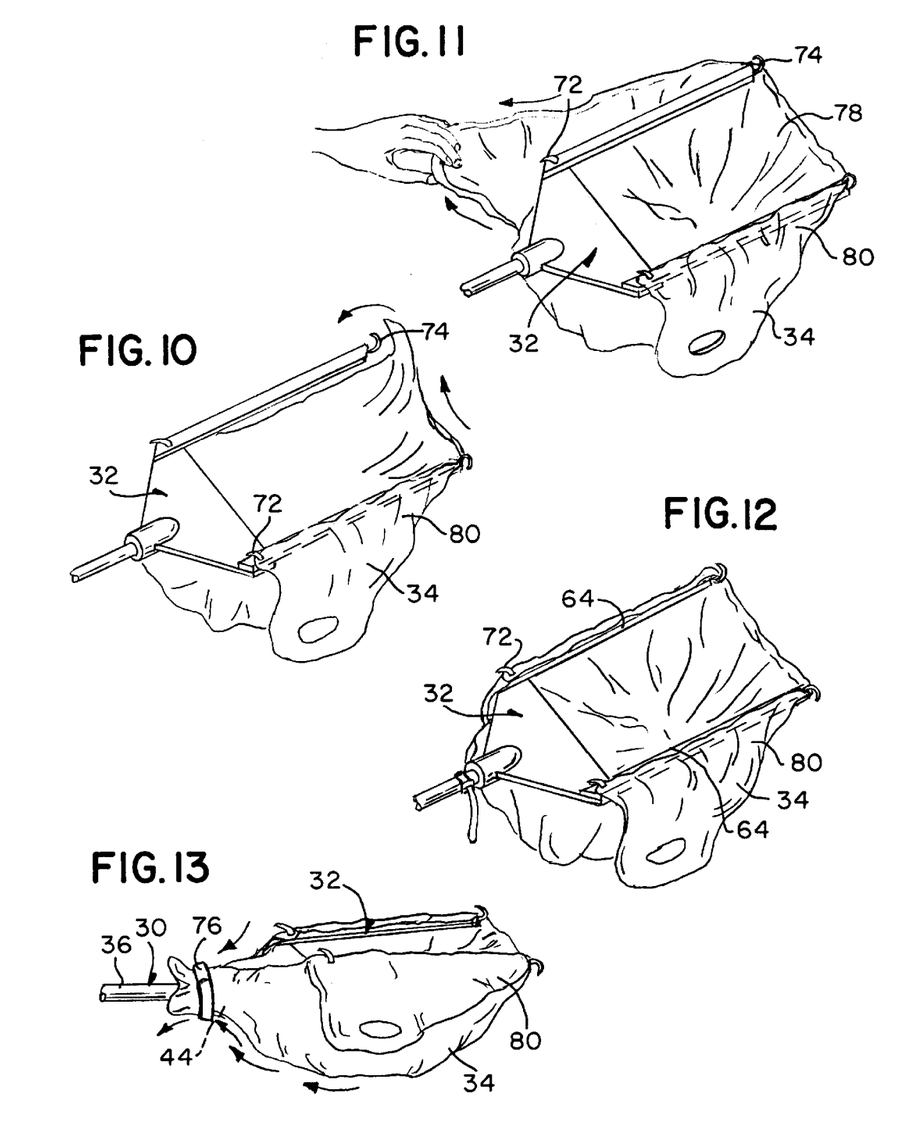
FIG. 10 is a diagrammatic perspective view of the third step in attaching the disposable plastic bag to the arm arrangement.
FIG. 11 is a diagrammatic perspective view of the fourth step in attaching the disposable plastic bag to the arm arrangement.
FIG. 12 is a diagrammatic perspective view of the fifth step in attaching the disposable plastic bag to the arm arrangement.
FIG. 13 is a diagrammatic perspective view of the sixth and final step in attaching the disposable plastic bag to the arm arrangement.
Figure 14A:
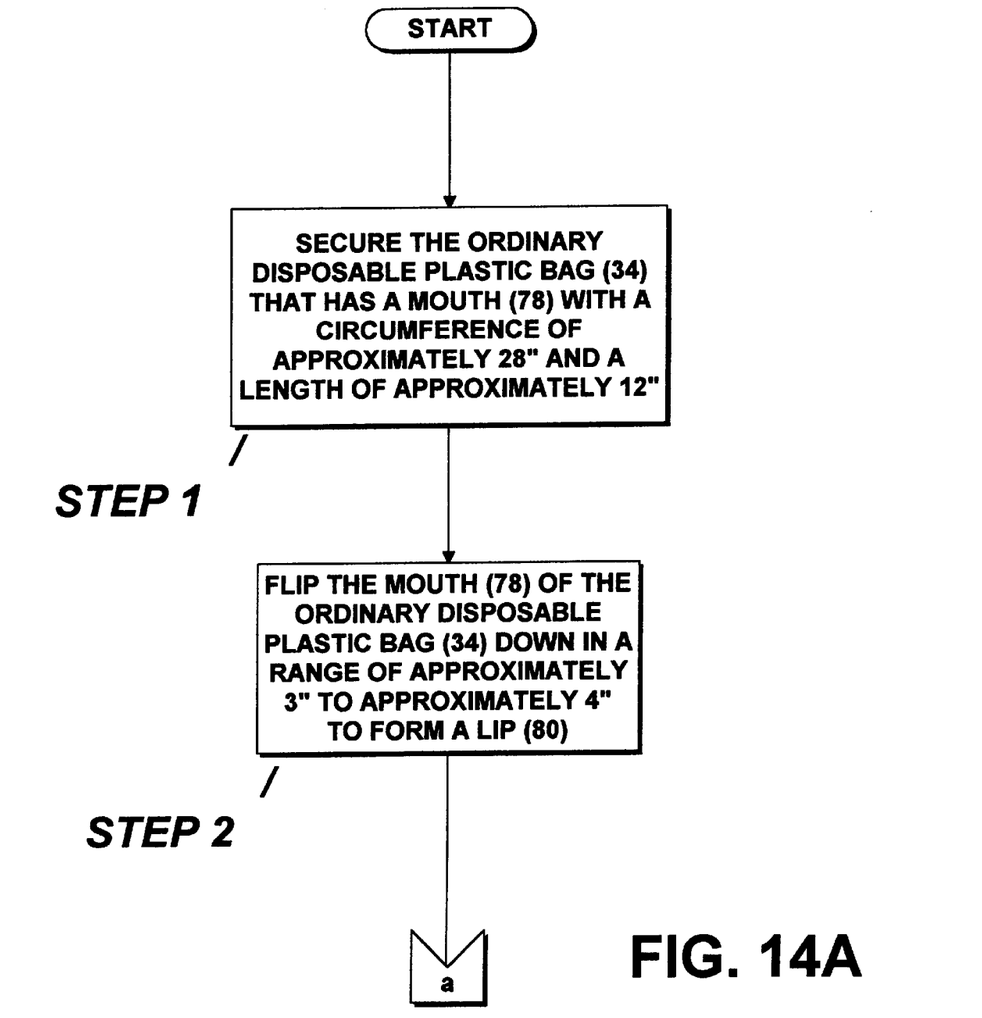
FIG. 14A–G are a process chart for attaching the disposable plastic bag to the arm arrangement.
Figure 14B:
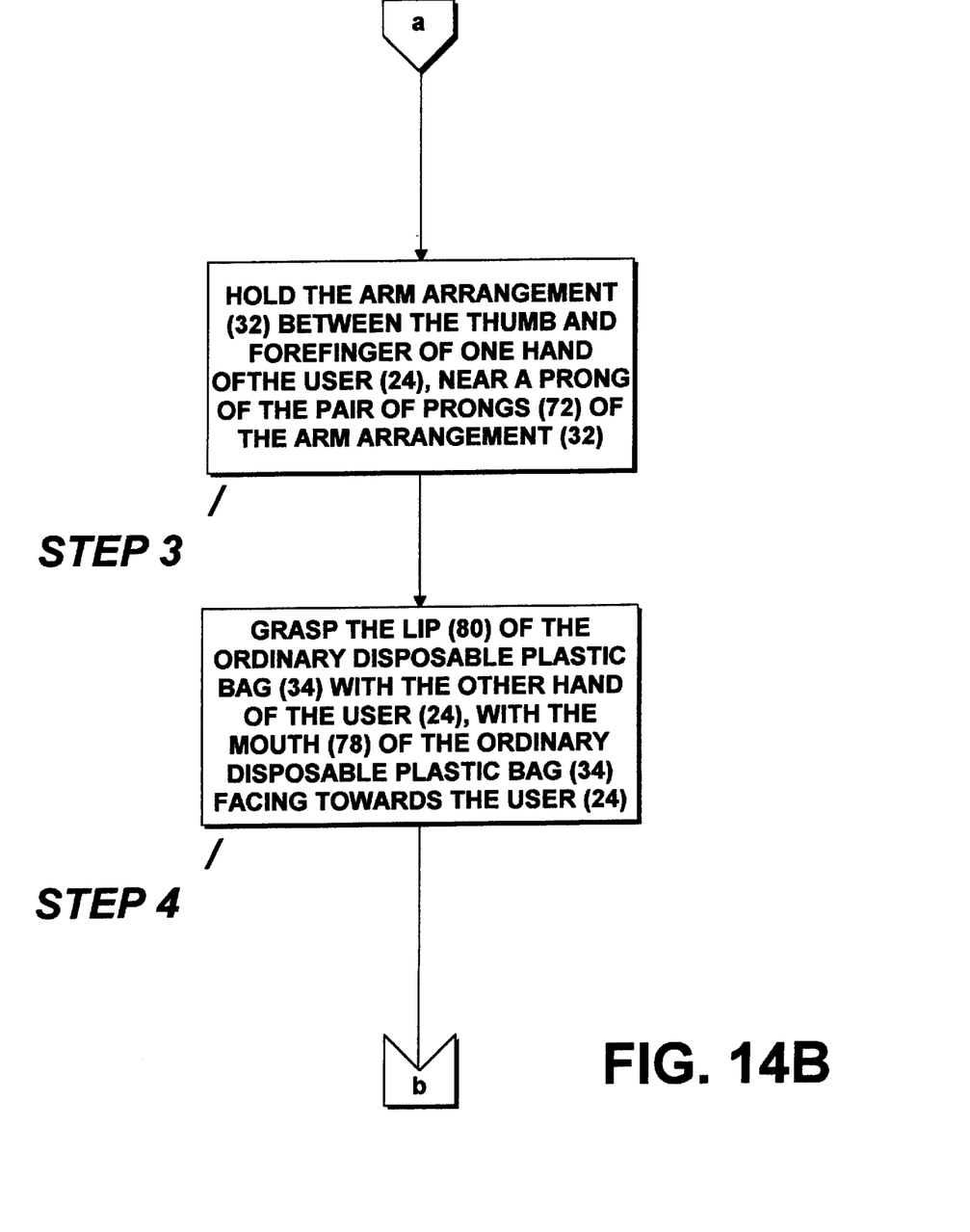
Figure 14C:
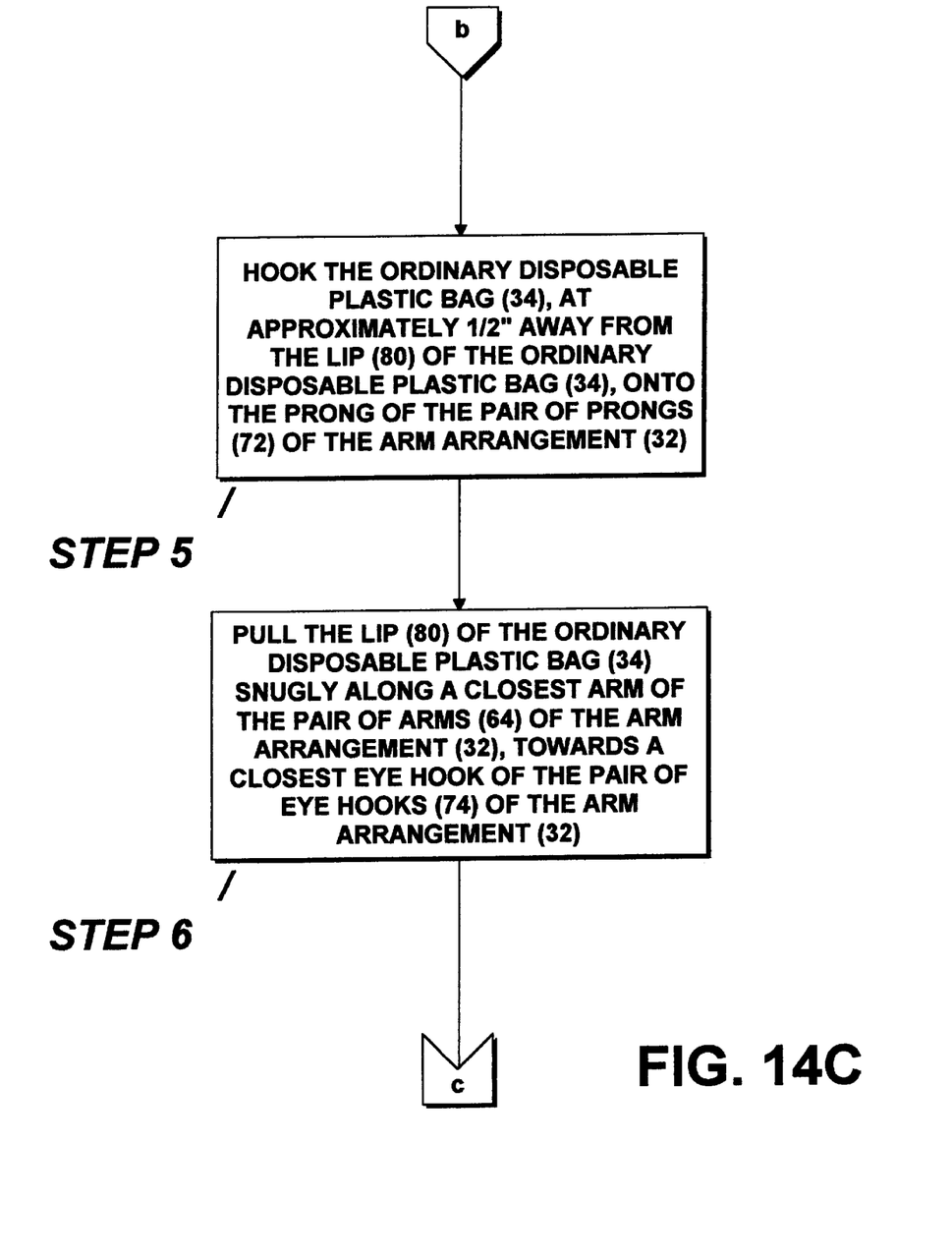
Figure 14D:
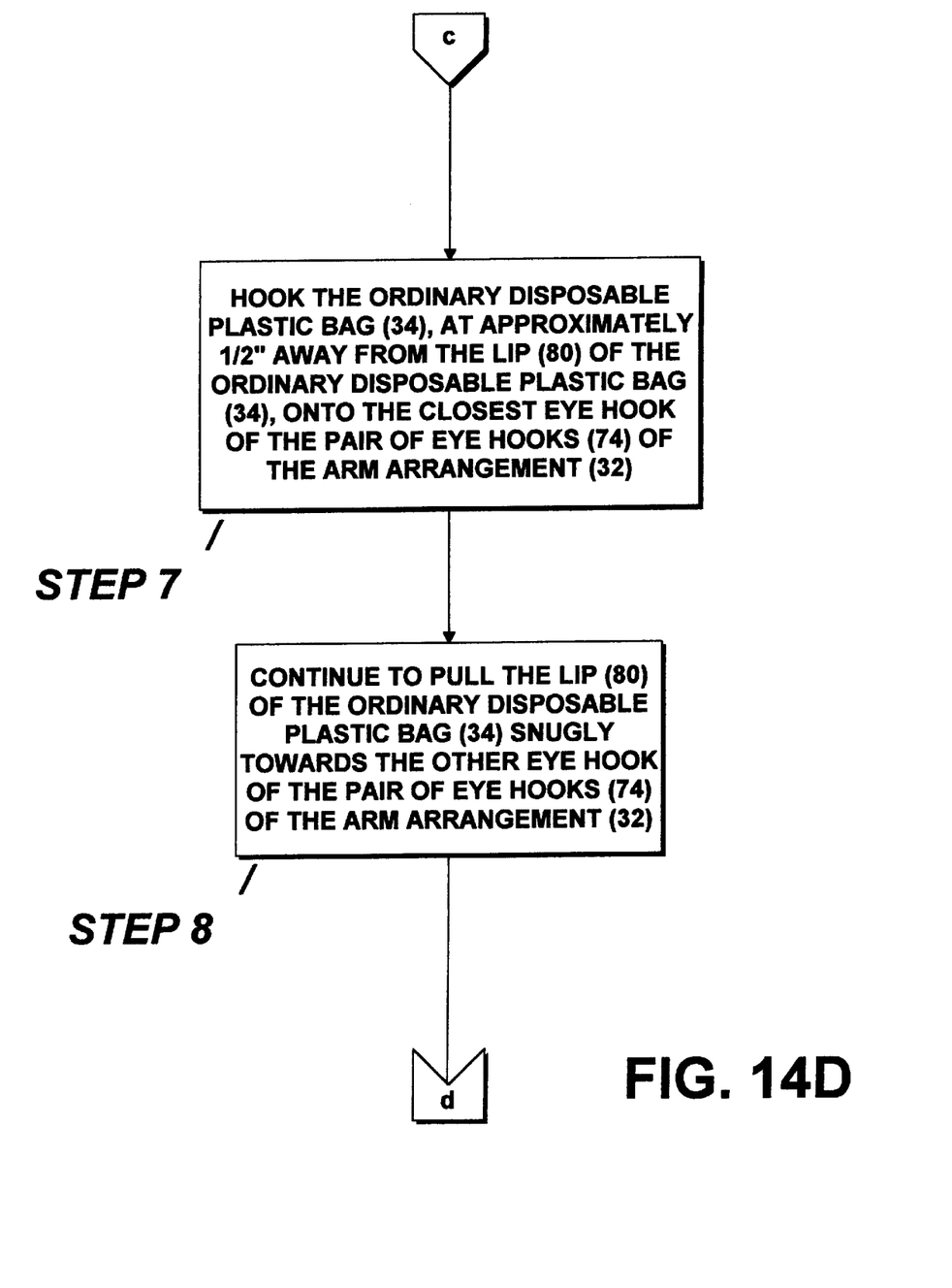
Figure 14E:
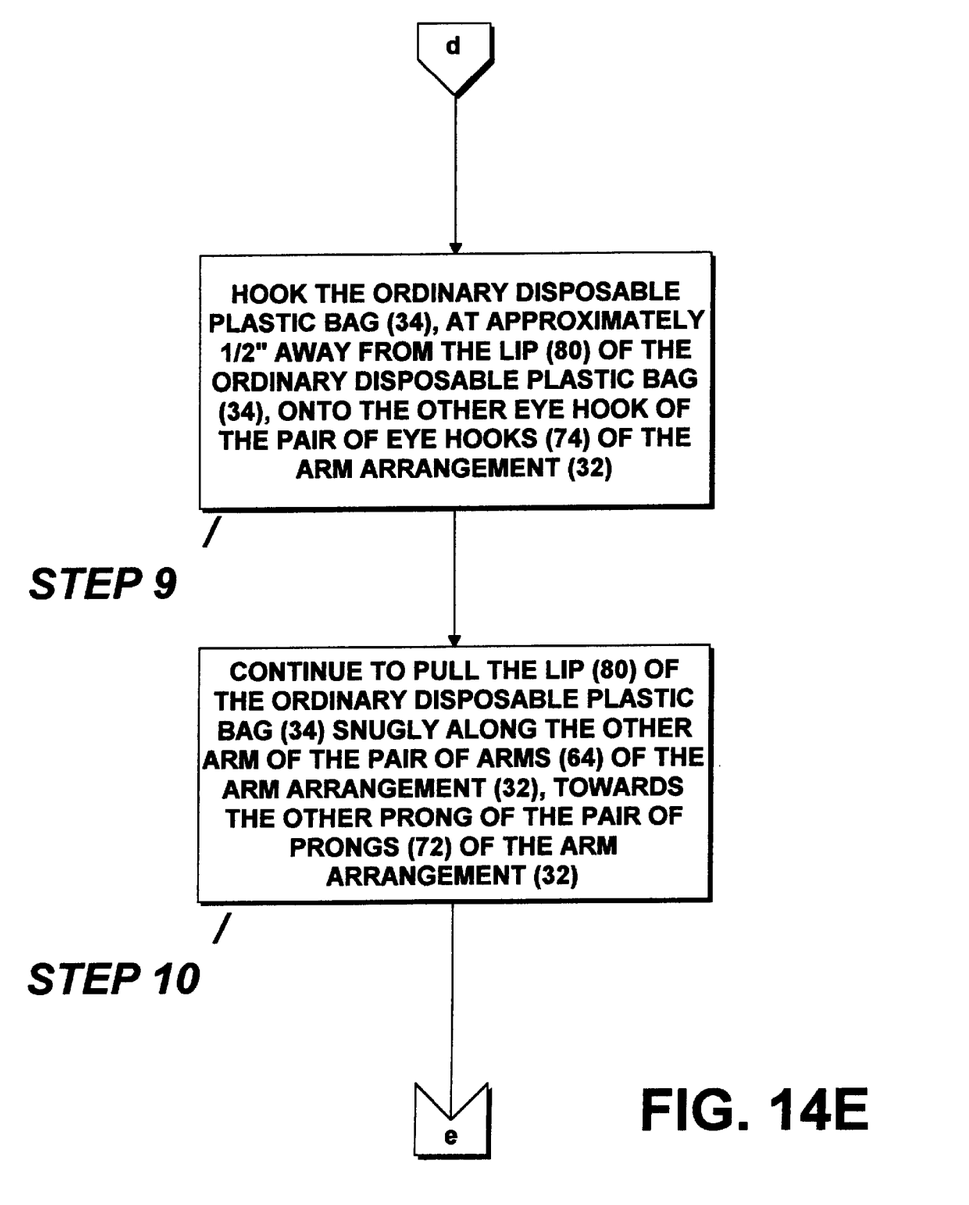
Figure 14F:
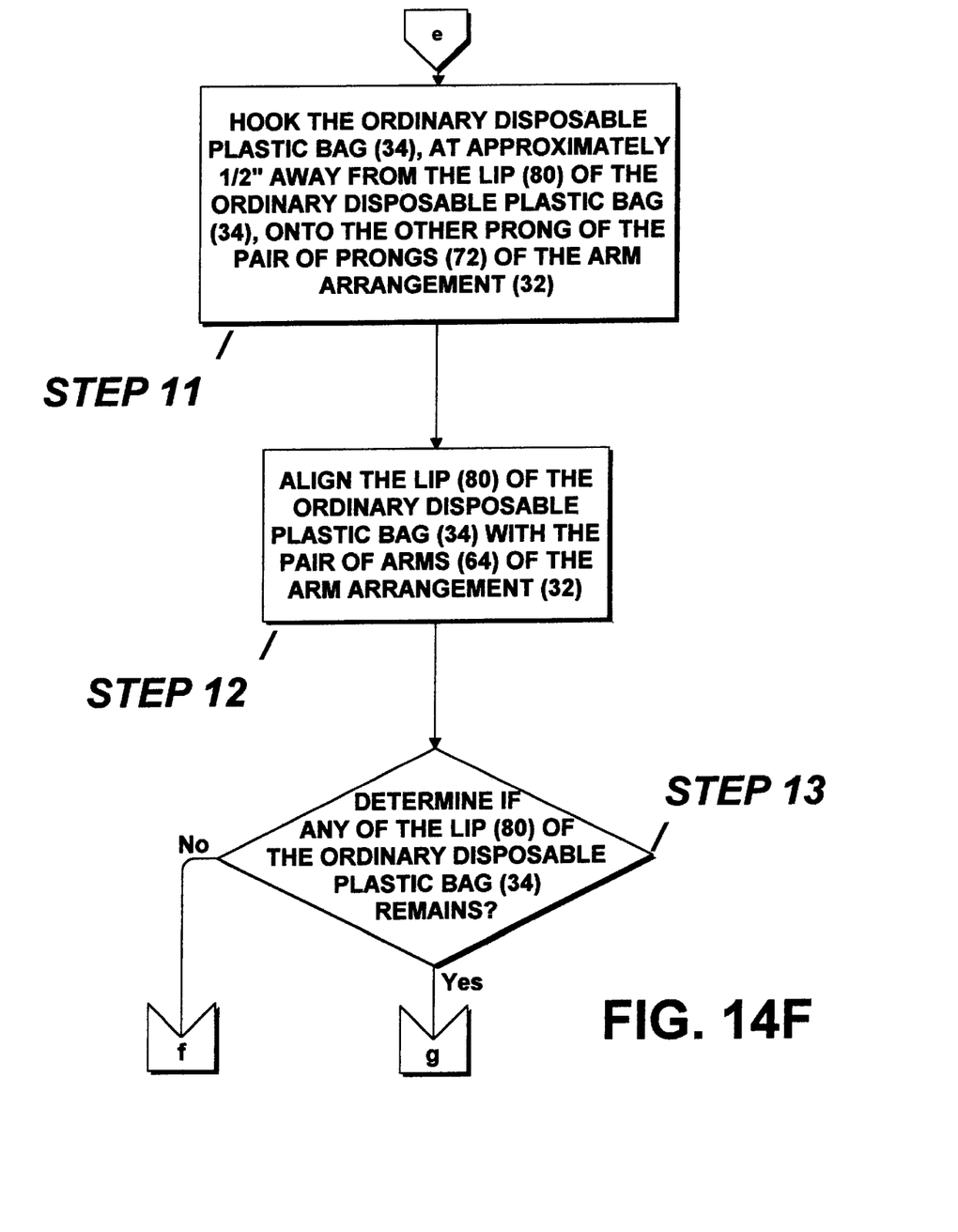
Figure 14G:
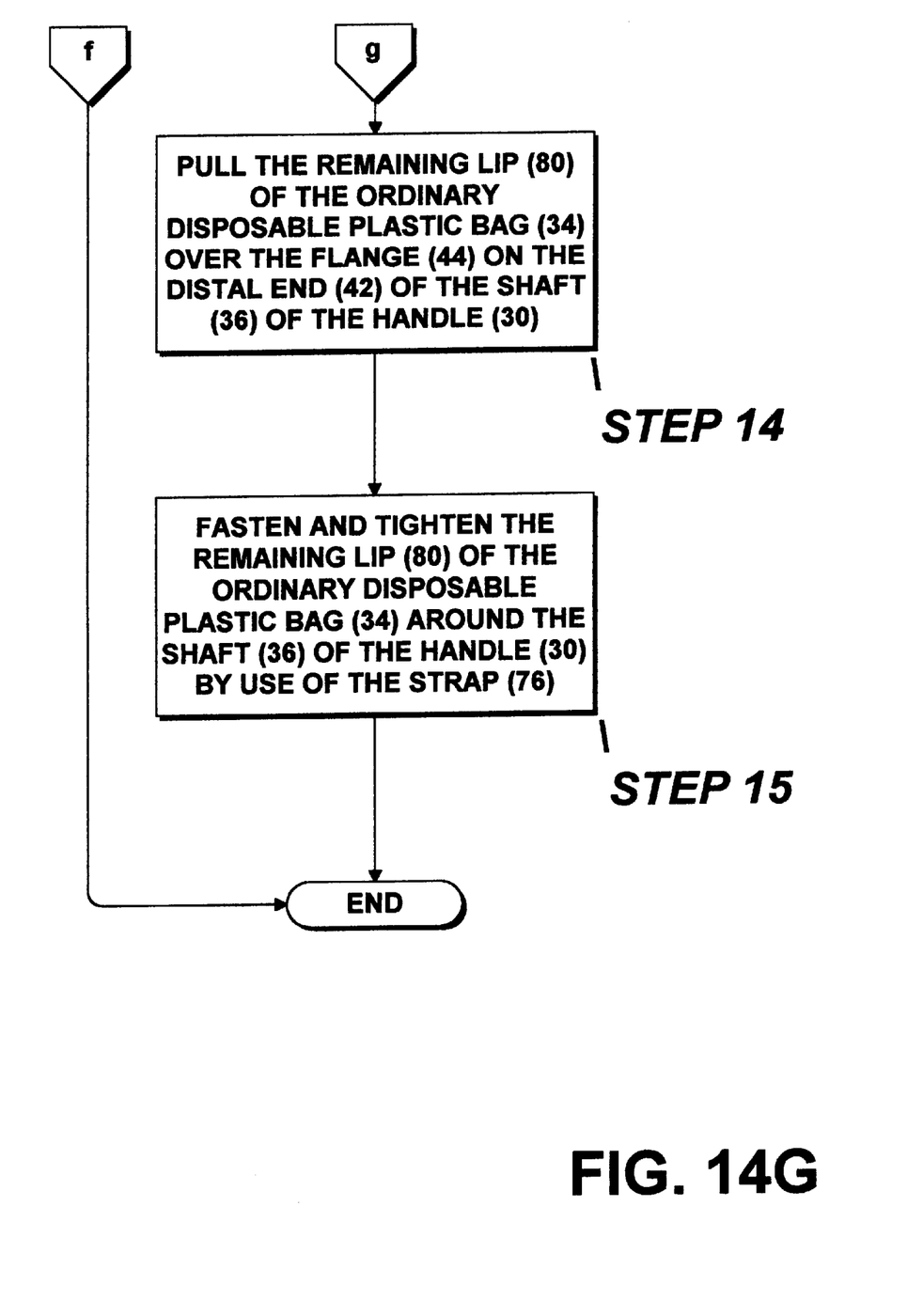

STEP 7: As shown in FIG. 10, hook the disposable plastic bag 34, at approximately ½" away from the lip 80 of the disposable plastic bag 34, onto the closest eye hook of the pair of eye hooks 74 of the arm arrangement 32.

STEP 8: As shown in FIG. 10, continue to pull the lip 80 of the disposable plastic bag 34 snugly towards the other eye hook of the pair of eye hooks 74 of the arm arrangement 32.

STEP 9: As shown in FIG. 11, hook the disposable plastic bag 34, at approximately ½" away from the lip 80 of the disposable plastic bag 34, onto the other eye hook of the pair of eye hooks 74 of the arm arrangement 32.

STEP 10: As shown in FIG. 11, continue to pull the lip 80 of the disposable plastic bag 34 snugly along the other arm of the pair of arms 64 of the arm arrangement 32, towards the other prong of the pair of prongs 72 of the arm arrangement 32.

STEP 11: As shown in FIG. 12, hook the disposable plastic bag 34, at approximately ½" away from the lip 80 of the disposable plastic bag 34, onto the other prong of the pair of prongs 72 of the arm arrangement 32.

STEP 12: As shown in FIG. 13, align the lip 80 of the disposable plastic bag 34 with the pair of arms 64 of the arm arrangement 32.

STEP 13: Determine if any of the lip 80 of the disposable plastic bag 34 remains.

STEP 14: As shown in FIG. 13, pull any remaining lip 80 of the disposable plastic bag 34 over the flange 44 on the distal end 42 of the shaft 36 of the handle 30, if answer to step 13 is yes.

STEP 15: As shown in FIG. 13, fasten and tighten the remaining lip 80 of the disposable plastic bag 34 around the shaft 36 of the handle 30 by use of the strap 76.

It will be understood that each of the elements described above, or two or more together, may also find a useful application in other types of constructions differing from the types described above.

While the invention has been illustrated and described as embodied in a device for disposing of feces from an animal utilizing an disposable plastic bag, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for holding in a hand of a user and for disposing of feces from animal by utilizing a disposable plastic bag without a need for a custom-bag, said device comprising:

a) a handle for holding in the hand of the user; and
   b) an arm arrangement extending from said handle for removably engaging the ordinary disposable plastic bag, wherein said handle comprises a shaft that is slender and elongated, and telescopically adjustable by a collar, and has:
      i) a proximal end; and
      ii) a distal end, wherein said distal end of said shaft of said handle widens into a circumferential flange therearound, with an externally threaded nipple being narrower than and extending axially therefrom, wherein said arm arrangement comprises a body that is substantially U-shaped, and extends axially from, opens away from, and is replaceable attached to, said distal end of said shaft of said handle, wherein said body of said arm arrangement has a transverse portion that is isosceles-triangular-shaped in plan view, and has:
         A) an apex;
         B) a pair of legs that widen away from said apex of said transverse portion of said body of said arm arrangement and in a pair of base angles with upper surfaces; and
         C) a base, wherein said body of said arm arrangement further has a collar that extends axially away from said apex of said transverse portion of said body of said arm arrangement, and has internal threads that extend axially therein and which replaceably and threadably engage said externally threaded nipple of said distal end of said shaft of said handle, with said transverse portion of said body of said arm arrangement being perpendicular to said handle.

2. The device as defined in claim 1, wherein said handle further comprises a non-slip boot that extends over said proximal end of said shaft of said handle for facilitating grip of the hand of the user.

3. A device for holding in a hand of a user and for disposing of feces from an animal by utilizing a disposable plastic bag, said device comprising:

a) a handle for holding in the hand of the user; and
   b) an arm arrangement extending from said handle for removably engaging the disposable plastic bag, wherein said handle comprises a shaft that is slender and elongated, and telescopically adjustable by a collar, and has:
      i) a proximal end; and
      ii) a distal end, wherein said distal end of said shaft of said handle widens into a circumferential flange therearound, with an externally threaded nipple being narrower than and extending axially therefrom, wherein said arm arrangement comprises a body that is substantially U-shaped, and extends axially from, opens away from, and is replaceably attached to, said distal end of said shaft of said handle, wherein said body of said arm arrangement has a transverse portion that is isosceles-triangular-shaped in plan view, and has:
         A) an apex;
         B) a pair of legs that widen away from said apex of said transverse portion of said body of said arm arrangement and terminate in a pair of base angles with upper surfaces; and
         C) a base, wherein said body of said arm arrangement further has a pair of arms that are parallel, coplaner, slender, elongated, and rectangular-parallelepiped-shaped, wherein each arm of said pair of arms of said body of said arm arrangement extends, at a proximal end thereof, axially away from an upper surface of said pair of upper surfaces of a respective base angle of said pair of base angles of said transverse portion of said body of said arm arrangement, to a distal end thereof.

4. The device as defined in claim 3, wherein said proximal end of each arm of said pair of arms of said body of said arm arrangement is beveled to match that of said respective base angle of said pair of base angles of said transverse portion of said body of said arm arrangement.

5. The device as defined in claim 3, wherein said distal end of each arm of said pair of arms of said body of said arm arrangement has an inner surface that is beveled and faces each other.

6. The device as defined in claim 5, wherein said body of said arm arrangement further has a pair of prongs.

7. The device as defined in claim 6, wherein each prong of said pair of prongs of said body of said arm arrangement extends arcuately upwardly and rearwardly from said proximal end of a respective arm of said pair of arms of said body of said arm arrangement.

8. The device as defined in claim 6, wherein said body of said arm arrangement further has a pair of eye hooks.

9. The device as defined in claim 8, wherein each eye hook of said pair of eye hooks of said body of said arm arrangement extends arcuately outwardly from said inner surface of said distal end of a respective arm of said pair of arms of said body of said arm arrangement.

10. The device as defined in claim 8, further comprising a strap being replaceably wound around said shaft of said handle.

11. The device as defined in claim 3, wherein said handle further comprises a non-slip boot that extends over said proximal end of said shaft of said handle for facilitating grip of the hand of the user.

\* \* \* \* \*